(No Model.) 5 Sheets—Sheet 1.

W. CLINE.
STOCK CAR.

No. 564,303. Patented July 21, 1896.

WITNESSES:
Ella L. Gerhart
Geo. A. Lane

INVENTOR
William Cline
BY Wm. R. Gerhart
ATTORNEY.

(No Model.) 5 Sheets—Sheet 2.

W. CLINE.
STOCK CAR.

No. 564,303. Patented July 21, 1896.

WITNESSES:
Ella L. Gerhart
Geo. W. Lane

INVENTOR
William Cline
BY Wm. R. Gerhart
ATTORNEY.

(No Model.) 5 Sheets—Sheet 3.

W. CLINE.
STOCK CAR.

No. 564,303. Patented July 21, 1896.

WITNESSES:
Ella L. Gerhart
Geo. A. Law

INVENTOR
William Cline
BY Wm. R. Gerhart
ATTORNEY.

(No Model.) 5 Sheets—Sheet 4.
W. CLINE.
STOCK CAR.

No. 564,303. Patented July 21, 1896.

WITNESSES:
Ella L. Gerhart
Geo. A. Lane

INVENTOR
William Cline
BY Wm. R. Gerhart
ATTORNEY.

(No Model.) 5 Sheets—Sheet 5.
W. CLINE.
STOCK CAR.
No. 564,303. Patented July 21, 1896.
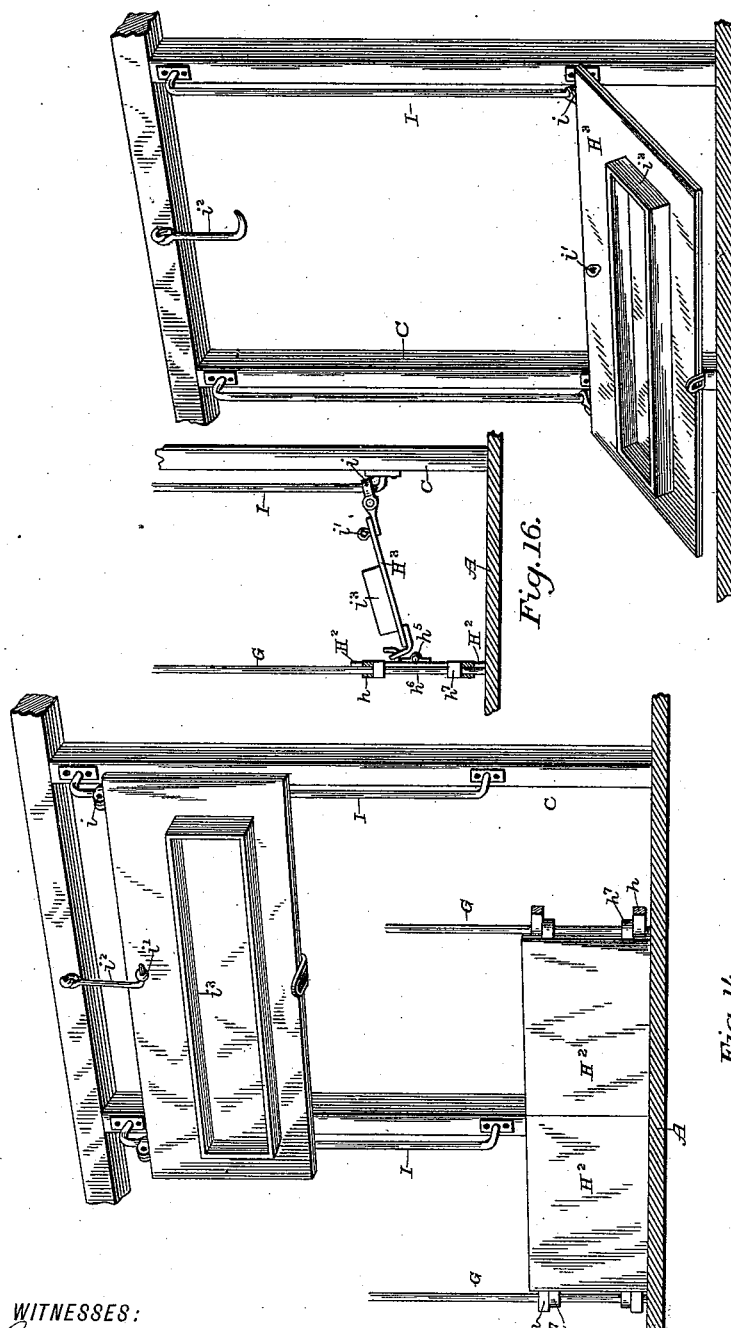
WITNESSES:
Geo. A. Lane
Ella L. Gerhart
INVENTOR
Wm. Cline
BY Wm. R. Gerhart
ATTORNEY.

UNITED STATES PATENT OFFICE.

WILLIAM CLINE, OF LANCASTER, PENNSYLVANIA, ASSIGNOR TO DANIEL D. GOOD AND SAMUEL B. BITZER, OF SAME PLACE.

STOCK-CAR.

SPECIFICATION forming part of Letters Patent No. 564,303, dated July 21, 1896.

Application filed January 3, 1891. Serial No. 376,666. (No model.)

*To all whom it may concern:*

Be it known that I, WILLIAM CLINE, a citizen of the United States, residing in Lancaster, in the county of Lancaster and State of Pennsylvania, have invented certain Improvements in Stock-Cars, of which the following is a specification.

This invention relates to improvements in that class of cars employed more particularly for the transportation of horses and cattle; and the invention consists in the construction and combination of the various parts, as hereinafter fully described, and then pointed out in the claims.

Figure 1:
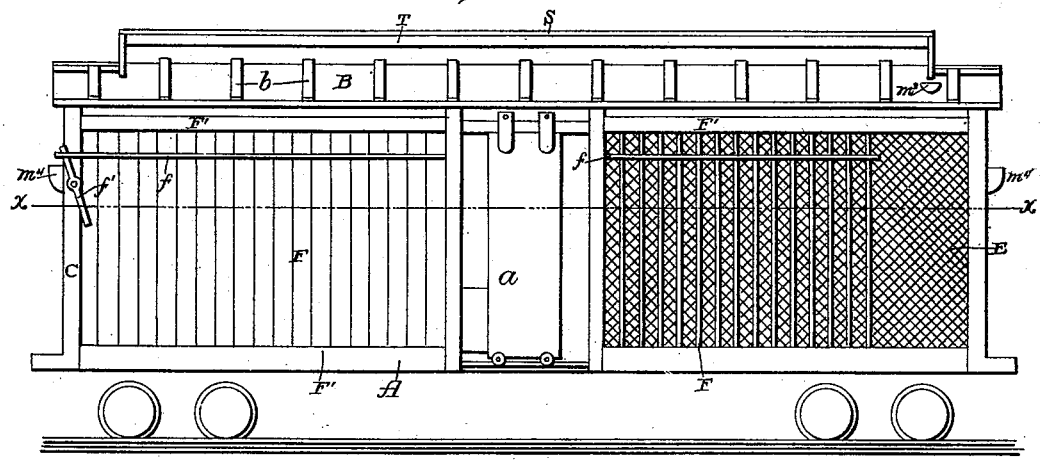
Figure 2:
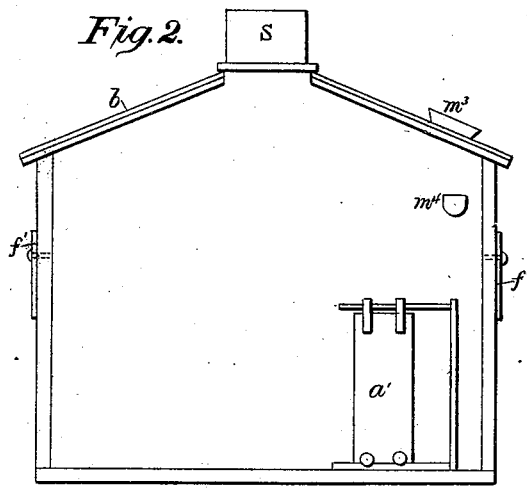
Figure 3:
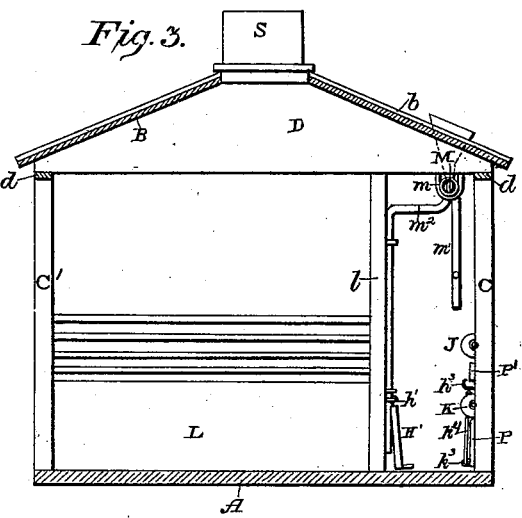
Figure 4:
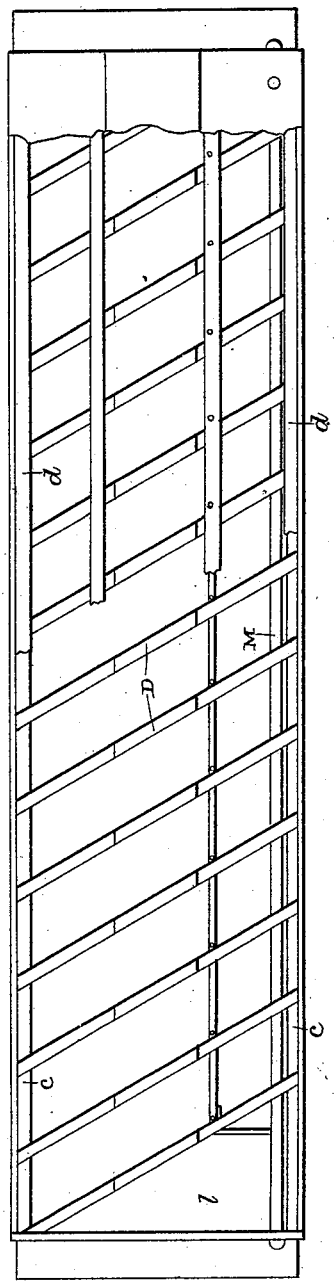
Figure 5:
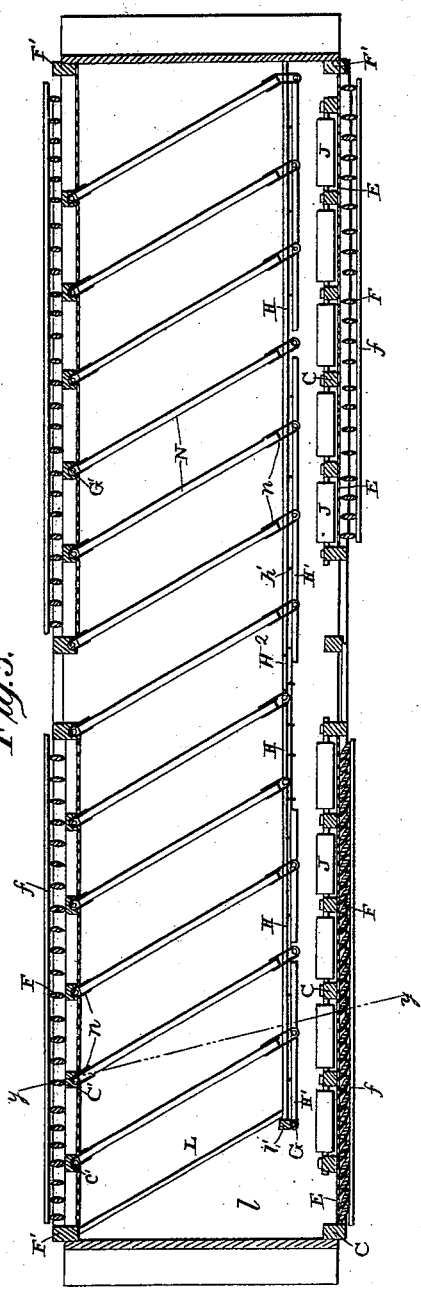
Figure 6:
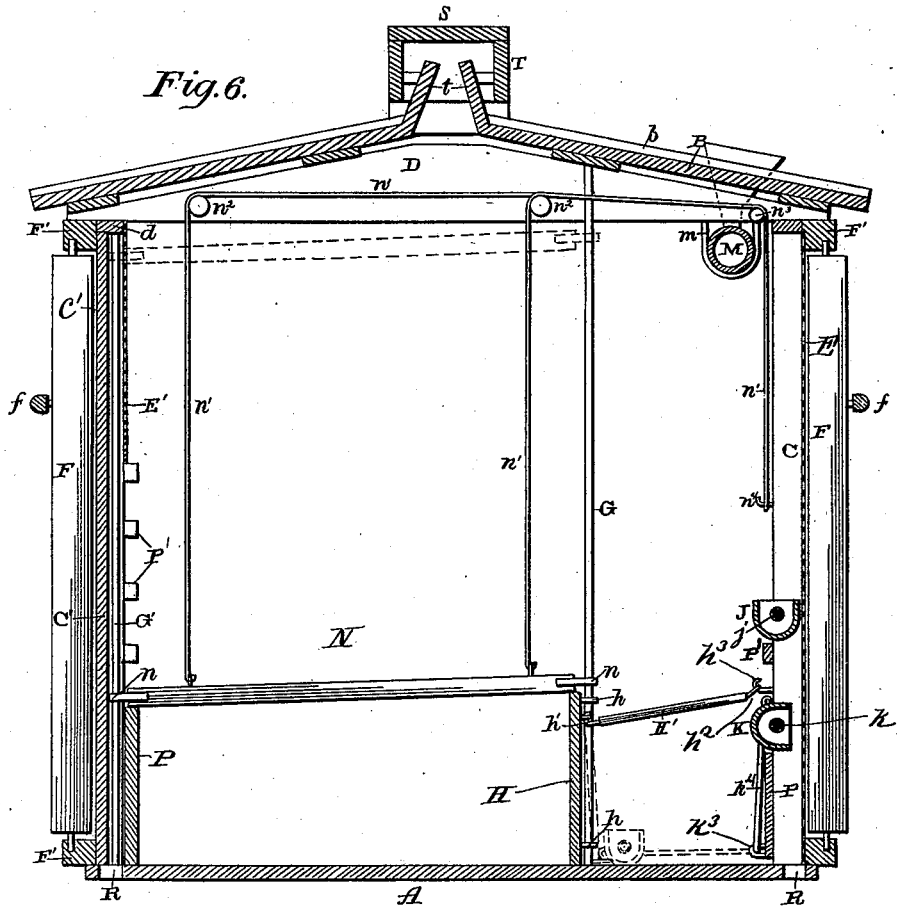
Figure 7:
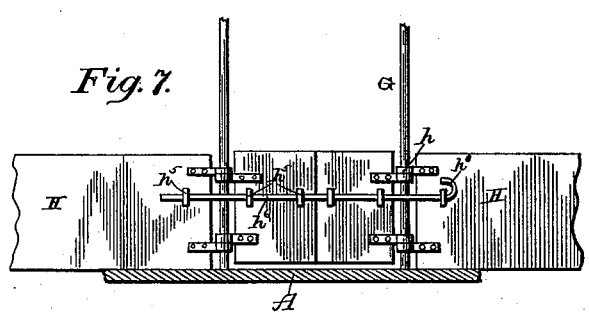
Figure 8:
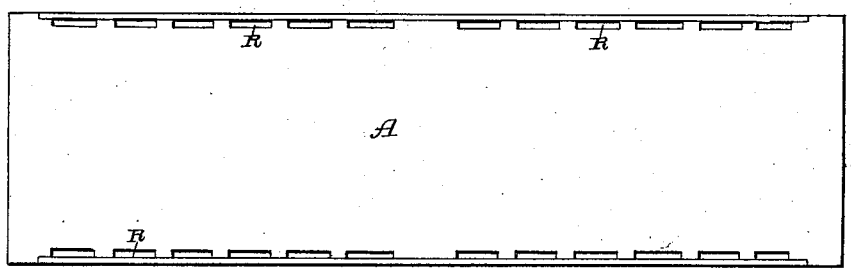
Figure 9:
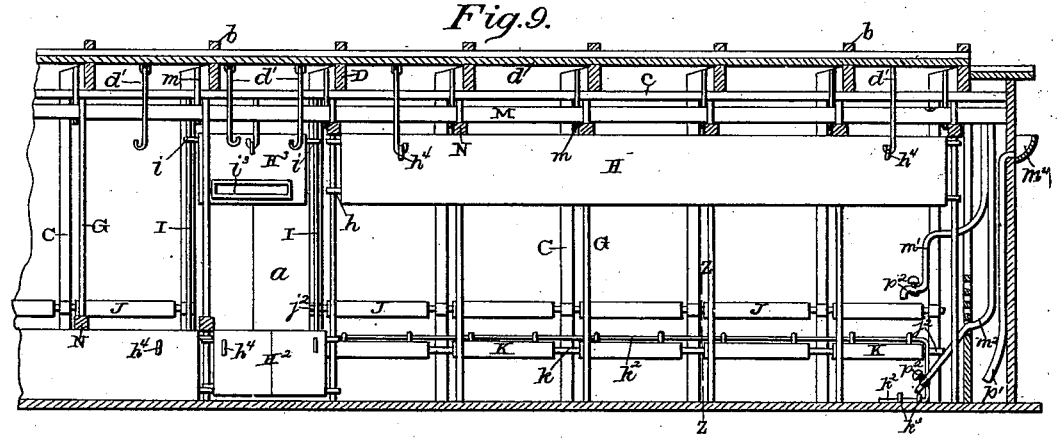
Figure 10:
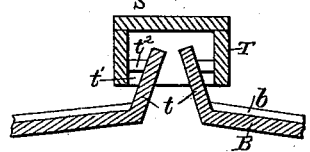
Figure 11:
Figure 12:
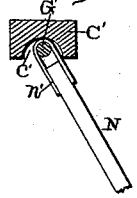
Figure 13:
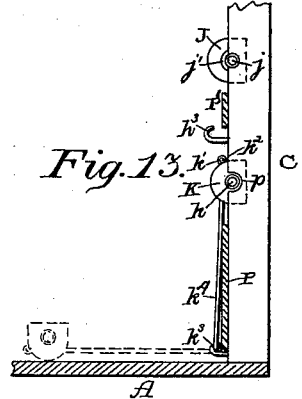

In the accompanying drawings, which form a part of this specification, Figure 1 is a side elevation of a car embodying my improvements, the slats being shown in a closed position at one end and in an open position at the other end, a portion of the slats at the open end being cut away. Fig. 2 is an end elevation of the car; and Fig. 3, a similar view, but showing the end open to permit a view of the interior of the car. Fig. 4 is a top plan view of the car, the roof being removed to show the arrangement of the rafters and purlins. Fig. 5 is a horizontal section on broken line *x x*, Fig. 1. Fig. 6 is an enlarged vertical section of the car on broken line *y y*, Fig. 5. Fig. 7 is an elevation of the doors in the manger-partition as seen from the inside of the manger. Fig. 8 is a bottom plan view of the car. Fig. 9 is a vertical longitudinal section of a portion of the car, showing one section of the manger-partitions lowered and the other section in a raised position. Fig. 10 is an enlarged transverse vertical section of the ventilator on the top of the car; and Fig. 11, a plan view of a portion of the same, the top or covering plate being cut away. Fig. 12 is an enlarged horizontal section through one of the posts at the back of the stalls, taken above the position occupied by the stall-partition when lowered. Fig. 13 is an enlarged vertical section of the side of the car on which the water-troughs are placed, those troughs being shown folded up against the side of the car. Fig. 14 is an enlarged inside perspective view of the feed-board H³ and its connections with the posts C, the board being shown in an elevated position; and Fig. 15, a similar view showing said feed-board lowered and in position to be secured to the doors H². Fig. 16 is a side view of the feed-board H³ and its connections with post C and doors H².

Similar letters indicate like parts throughout the several views.

Referring to the details of the drawings, A indicates the floor of the car; C, the posts supporting the roof on the side of the car on which the manger is located; C', like posts on the opposite side of the car; *c*, the cap pieces or plates resting on the posts; D, the rafters, extending diagonally across the car; *d*, the purlins; B, the roof; and *b*, the roof-battens.

Ventilation is secured through the sides of the car by means of vertical slats F, pivoted at top and bottom in stringers F', secured to posts C and C'. To better support stringers F', and to prevent contact of slats F with screens E E', to be described, the end posts C C' and those on each side of the central doors are widened or extended out beyond the intermediate posts a distance equal to the width of said stringers, as shown in Fig. 5.

Each set of slats on the sides of the central door *a* is hinged to an adjusting-bar *f*, operated by a lever *f'*, pivoted at the end of the car. Inside of the slats wire screens are secured to the posts. Those, E, on the side of the posts C are fastened thereto between stringers F' and said posts and extend from the upper to the lower stringers; but those, E', on the side of the posts C' are fastened to the inside of the posts and only extend from the top of the guard-slats P' upward.

On the lower part of the inner face of the posts on each side of the car is nailed a plank sheeting P, between the bottom of which and the floor of the car is left an opening, and above the sheeting are also nailed slats P', before mentioned. Between the posts are openings R, cut through the floor of the car, as shown in Fig. 8, through which openings the dirt in the car is discharged when cleaning the same, being pushed or swept under sheetings P to the openings. These floor-openings are also of much importance in ventilating the car, for in very cold weather and during severe and driving rain or snow storms the side openings are intended to be entirely closed, and ventilation is then obtained through said floor-openings, through which, by reason of their position, a plentiful supply of fresh air is obtained and rain and snow prevented from entering the car, which could not be done were said openings placed in the sides or ends of the car.

Posts C' have vertical grooves c' cut or formed in their inside faces; and located in these grooves are guide-rods G', secured in the floor and in the cap-plate above. On the opposite side of the car are similar guide-rods G, secured in the floor and in one of the purlins a suitable distance from the side of the car to leave a space for a manger between them and the said side of the car, as will be described. This housing of guide-rods G' in vertical grooves c' places them out of the way and protects them, so that they cannot be unduly bent by the kicking of the animals.

On each side of the central door in the side of the car adjacent to which guide-rods G are located are vertically-movable manger-partitions H, having on their faces rings or staples $h$, which engage the guide-rods G. On the opposite faces of the manger-partitions are also secured rings or staples $h^4$, adapted to be engaged by hinged hooks $d'$, depending from one of the purlins, when said partitions H are raised up beneath the rafters.

Feed-boards H' are hinged to the manger-partitions H between the rings $h$, as shown at $h'$, and on the free edges of said boards are rings $h^2$, adapted to engage hooks $h^3$ on the side of the car when said boards H' are raised to form feed-troughs. I have hinged the feed-boards to the manger-partitions that they might be out of the way when said partitions are raised up to the rafters, for were the feed-boards hinged to the side of the car they would be in continual danger of being torn from their fastenings when the manger-partitions were raised and the car loaded with cattle.

The inner ends of the manger-partitions have the rings $h$ secured in the edges, and the rods G at those points are so disposed as to be in position to engage said rings. The space between said rods at the inner ends of the partitions H is closed by double doors H², which are attached to said rods G in the same way as are the partitions H, the rings $h^7$, connecting said doors and rods, engaging the rods between the rings connecting the manger-partitions therewith. These doors are held in a closed position by a rod $h^6$, engaging with staples $h^5$ on the inner faces of said doors and the adjacent ends of the stall-partitions, as shown in Fig. 7. When the stall-partitions are to be raised, the rod $h^6$ is disengaged from the staples $h^5$, and after said partitions are elevated the said staples are engaged by hooks $d'$ in the same manner as staples on the partitions H are engaged by similar hooks, as shown in Fig. 9, or the doors H² may be folded back against the front faces of partitions H before said partitions are raised, and secured thereto by hooks or otherwise.

On the inner faces of the posts C, opposite doors H², are affixed rods I, which are engaged by rings $i$ on a feed-board H³, constructed to be raised and held in an elevated position by the engagement of a pendent hook $i^2$ with a staple $i'$, on the face of said feed-board. When the doors H² are closed and the space back of them used as a stall, the feed-board H³ is lowered to a level with the other feed-boards, and its free edge is turned up and secured by a ring and hook, so as to form a feed-trough. On the upper or outer face of feed-board H³ is fastened a water-trough $i^3$.

On each side of the central door $a$ of the car is arranged a series of water-troughs J, for watering horses. The ends of each series of troughs are supported by journals $j^2$ in boxes formed in the posts C that are located opposite the ends of the manger-partitions H. There is a trough for each stall, those of each series being connected by pipes $j$, resting in bearings $j'$, cut in the posts between each two troughs, so that water may be supplied to all the troughs of each series by running it into one. These troughs are turned in their bearings, so as to throw their open sides upward when they are to be used, as shown in Fig. 6, and are turned back with their open sides toward the side of the car when not in use or when the contents are to be emptied therefrom, as shown in Figs. 3, 9, and 13, the water from the troughs being discharged between the sheeting P and the side of the car and escaping through the openings R in the floor of the car.

K represents similar series of troughs, connected by pipes $k$, and intended to be used for watering cattle. But the troughs K are supported by hinge-rods $k^2$, passing through staples $k'$, projecting from the upper or outer sides of the troughs. On the outer end of each rod $k^2$ is formed an arm $k^4$, which is hinged in staples $k^3$, secured to the bottom of the sheeting P, as seen in Figs. 3 and 9.

When the troughs K are to be used they are turned down, so as to rest on the floor, with their open sides upward, as shown by dotted lines in Figs. 6 and 13; and when not in use they are turned up and rest between the posts C above the sheeting P, the connecting-pipes $k$ being received in recesses $p$ in the faces of the posts, any water or dirt in the trough being emptied out and escaping through the openings R in the bottom of the car in the same manner as with the horse-troughs. Two sets of troughs are thus provided, as during shipment it is more convenient for horses and cattle to drink from troughs having different elevations. By the journaling of the connecting-pipes of the horse-troughs in recesses in the posts and the engagement therewith of the similar pipes connecting the cattle-troughs the inner faces of those troughs project outside of the sheeting P when those troughs are, respectively, turned outward and folded up, so that the contents thereof may be discharged directly through the floor-opening R, and the connecting-pipes are at the same time stored more completely out of the way when not in use.

Above the watering-troughs is a cylindrical water tank or reservoir M, extending from end to end of the car and supported by straps $m$, fastened to the rafters D, and into which water is fed by the funnel $m^3$, projecting through the roof of the car. From the reservoir a pipe $m'$ extends downward at each end of the car, to supply the horse-troughs with water, and also a similar pipe $m^2$, for filling the cattle-troughs, each pipe being provided with a cock $p^2$. In case the water in the reservoir M should be frozen, the troughs may be supplied through funnels $m^4$, projecting from the end of the car, a hose being connected with the inner end for that purpose.

The car is entered at the ends through doors $a'$, and in one end of said car is a feed-chamber $l$, separated from the adjacent stall by a diagonal partition L, the inner end of which is supported by a post $l'$, located on the line of the manger-partitions, and between which and the side of the car there is an entrance into the space forming the mangers. If desirable, a similar feed-chamber may be partitioned off at the other end of the car.

N represents bars forming movable stall-partitions, having loop-straps $n$ on each end, which embrace the rods G G'. These partitions are raised to the rafters by two cords $n'$, connected with the top of each bar near its ends and passing upward to and over sheaves $n^2$, pivoted to the sides of the rafters, the united ends of the cords being carried over a sheave $n^3$, and then downward to hook $n^4$, and there secured, as shown in Fig. 6. When lowered, the stall-partitions rest upon the top of the manger-partitions and the upper edge of the sheeting P, secured to posts C'. Slats P' are nailed to posts C' at the sides of grooves $c'$ above sheeting P, but do not extend across said grooves. If desirable, the manger-partitions H may be raised in the same manner as are the stall-partitions.

S indicates a ventilator placed on the top of the car. Two flanges or ribs $t$ extend upward from the edges of a central opening in the roof of the car, which extends nearly the entire length thereof. Over these flanges is placed a cap, between the top of which and the upper edge of said flanges is left an open space. Depending sides T of the cap lap the outside of the flanges for a portion of the distance between the upper edges thereof and the roof, leaving a channel $t'$ on each side between the adjacent surfaces of said flanges and the depending sides, between which are placed filling-blocks $t^2$, through which the cap and flanges are connected, as seen in Figs. 6 and 10. Both ends of the ventilator are entirely closed.

When the car is to be loaded with horses, the stall-partitions are raised and the doors H² opened. The animals are loaded from the ends toward the center, and as each one is placed in its stall the stall-partition adjoining it toward the center of the car is lowered. In feeding hay the feed-boards are folded down and the hay placed in the manger formed by the manger-partitions, but when grain is fed the free ends of the feed-boards are raised and secured in that position successively from the opposite end of the space forming the mangers toward the feed-chamber. This arrangement of the feed-boards permits the attendant to freely use the manger as a passage. The screens secured on the outside of posts C prevent any portion of the hay which might escape through the bars P' from getting between the slats F and interfering with the movement or the adjustment of the same. They also prevent the entrance into the car of coal dirt, dust, &c., when the slats F are open, without obstructing the passage of air.

To transport cattle, the stall and the manger partitions are raised to the rafters and there secured, as has been described.

Side ventilation of the car is obtained by means of the pivoted slats, which, as will readily be seen, can be set in any direction necessary to conform with the movement of the car and the direction of the wind. In cold weather or during severe storms, when it is required to keep the slats tightly closed, ventilation is maintained by means of the floor-openings and the ventilator in the top of the car, the air being prevented from striking directly against the animals by the guard-board or sheeting P, while, when horses are carried in the car, the manger-partitions prevent any draft beneath the sheeting from circulating under them or striking directly against their breasts. This is an important consideration, as horses, because of their value and the greater care and shelter given them ordinarily, require more protection during transportation than that necessary for other animals carried by rail. These manger-partitions also prevent the air from striking directly under the horses when the slats are open, and thus, while the car is thoroughly ventilated, the draft is prevented from drawing directly under and up and around them. This arrangement for ventilating the car without exposing the animals to a direct draft is of particular importance, as it supplies them at all times with an abundance of fresh air and likewise saves them from the chilling effects produced by their standing directly in a draft. In addition to preventing the draft through the openings R from striking the animals, the sheeting on the posts also prevents the contents of the troughs discharged back of it from being splashed or blown back into the car, while the sheeting on the posts C' protects the slats and screens, if the latter be run down so far on those posts, from injury from kicking or other movements of the animals.

The stringers F' are of such width as to permit the slats to be turned freely without impinging against the screens E, and the posts C are so thick as to prevent the troughs, when turned outward or folded up, from interfering with said screens.

Having thus described my invention, what I claim as new, and desire to secure by Letters Patent, is—

1. The combination, in a stock-car, of manger-partitions located on the floor of the car, said partitions and the side of the car forming a passage-way, feed-boards adapted to be extended entirely across said passage-way, and means for detachably securing the feed-boards in such extended position, for the purpose specified.

2. The combination, in a stock-car, of manger-partitions located on the floor of the car, said partitions and the side of the car forming a passage-way, feed-boards hinged by one edge to a side of said passage-way, the feed-boards being adapted to be extended across the passage-way, and means for detachably securing the swinging edges of the feed-boards to the side of the passage-way opposite to that to which they are hinged, for the purpose specified.

3. The combination, in a stock-car, of sheeting secured to the inner faces of the lower portions of the side posts, manger-partitions located on the floor of the car inside of the sheeting, said partitions and sheeting forming a passage-way, feed-boards hinged by one edge to a side of said passage-way, the feed-boards being adapted to be extended across the passage-way, and means for detachably securing the swinging edges of the feed-boards to the side of the passage-way opposite to that to which they are hinged, for the purpose specified.

4. The combination, in a stock-car, of vertical rods set in from the side thereof, manger-partitions having rings or staples engaging said rods, the manger-partitions being constructed to be elevated toward the roof of the car, means for securing said manger-partitions in an elevated position, feed-boards having one edge hinged to the sides of the manger-partitions, the feed-boards being adapted to be extended across the passage separating said manger-partitions from the side of the car, and means for detachably securing the swinging edges of the feed-boards to the side of the car, substantially as and for the purpose specified.

5. The combination, in a stock-car, of vertical rods set in from the side thereof, manger-partitions on each side of the car-door having rings or staples engaging said rods, the manger-partitions being constructed to be elevated toward the roof of the car, means for securing said manger-partitions in an elevated position, feed-boards having one edge hinged to the sides of the manger-partitions, the feed-boards being adapted to be extended across the passage separating said manger-partitions from the side of the car, means for detachably securing the swinging edges of the feed-boards to the side of the car, doors hinged to and between the vertical rods adjacent to the inner ends of the manger-partitions and adapted to be elevated with said partitions, vertical rods on the door-posts, a feed-board having rings engaging said rods on the door-posts and constructed to be raised and held in an elevated position, said feed-board being adapted to be extended across the passage separating the car-door and the doors between the manger-partitions, and means for detachably securing the swinging edge of said feed-board to the doors between the manger-partitions, substantially as and for the purpose specified.

6. The combination, in a stock-car, of vertical guide-rods at the heads of the stalls, posts at the rear of the stalls having vertical grooves therein, guide-rods located in said grooves, bars forming stall-partitions, staples on the ends of the stall-partitions engaging said rods, means for supporting the stall-partitions in their normal positions, and means for elevating said stall-partitions, for the purpose specified.

7. The combination, in a stock-car, of a manger-partition set in from the side of the car, bars forming stall-partitions and having their front ends resting on the manger-partitions and their other ends supported at the rear of the stalls, vertical rods adjacent to the manger-partitions, similar rods located in vertical grooves in the side posts at the rear of the stalls, staples on the ends of the stall-partitions engaging the vertical rods, and means for elevating the stall-partitions, for the purpose specified.

8. In a stock-car, the combination, with vertical rods set in from one side of the car, of similar rods located adjacent to the posts on the other side of the car, manger-partitions extending lengthwise of the car and having rings or staples engaging the vertical rods set in from the side of the car, said manger-partitions being adapted to be elevated toward the roof of the car, means for securing the manger-partitions in an elevated position, sheeting secured to the lower parts of said posts, bars forming stall-partitions and having rings or staples engaging said vertical rods, the bars resting on said manger-partitions and sheeting, said bars being adapted to be elevated toward the roof of the car, and means for securing the bars in an elevated position, for the purpose specified.

9. In a stock-car, the combination, with vertical rods set in from one side of the car, of similar rods located adjacent to the posts on the other side of the car, manger-partitions extending lengthwise of the car and having rings or staples engaging the vertical rods set in from the side of the car, said manger-partitions being adapted to be elevated toward the roof of the car, means for securing the manger-partitions in an elevated position, sheeting secured to the lower parts of said posts, bars forming stall-partitions and having rings or staples engaging said vertical rods, the bars resting on said manger-partitions and sheeting, pulleys located above said bars, cords connected with the bars beneath the pulleys, the cords of each bar passing in the same direction over the pulleys above it and being then united and carried over a pulley at the side of the car, and means for securing the united ends of the cords, substantially as and for the purpose specified.

10. The combination, in a stock-car, of manger-partitions located on the floor of the car, said partitions and the side of the car forming a passage-way, feed-boards hinged by one edge to a side of said passage-way, the feed-boards being adapted to be extended across the passage-way, means for detachably securing the swinging edges of the feed-boards to the side of the passage-way opposite to that to which they are hinged, and a feed-chamber opening into the passage-way between the manger-partitions and the side of the car, for the purpose specified.

WILLIAM CLINE.

Witnesses:
JACOB HALBACH,
WM. R. GERHART.